United States Patent Office.

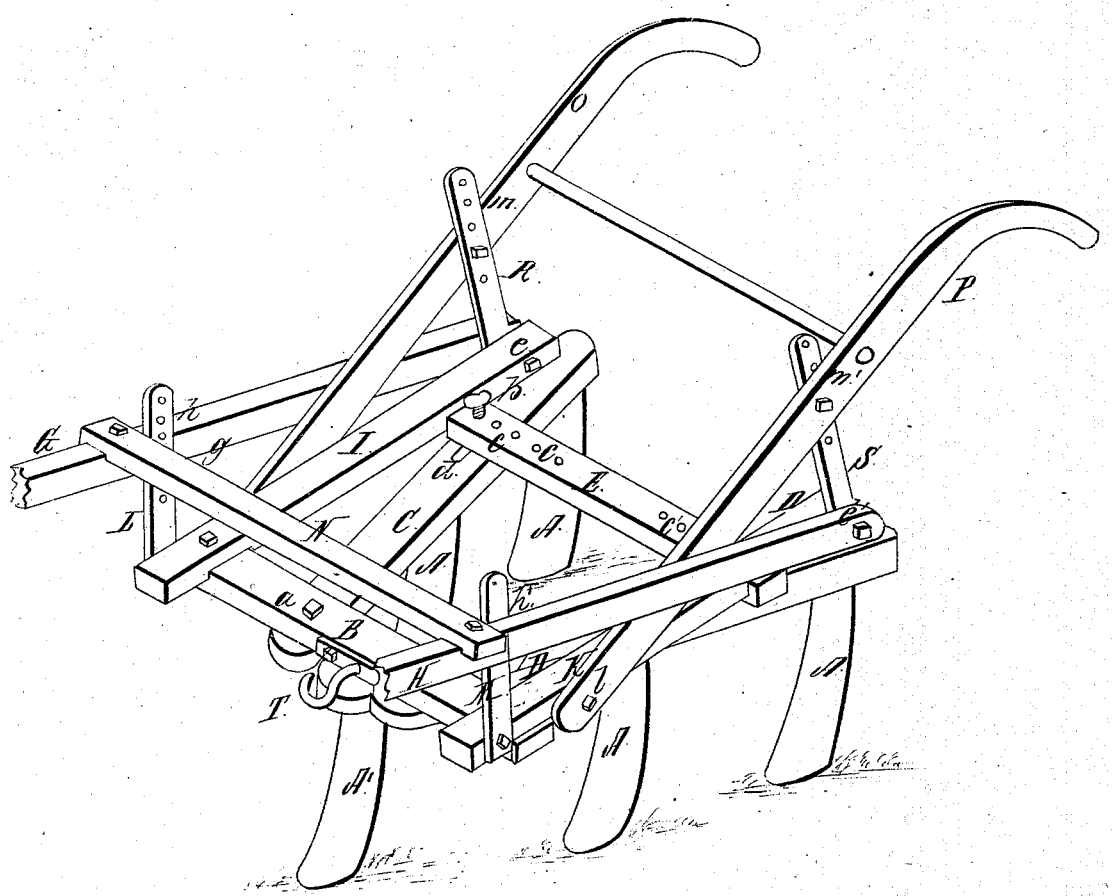

LEWIS G. TUTTLE, OF NORTH HAVEN, CONNECTICUT.

Letters Patent No. 62,302, dated February 19, 1867.

IMPROVEMENT IN CULTIVATORS.

*The Schedule referred to in these Letters Patent and making part of the same.*

TO ALL WHOM IT MAY CONCERN:

Be it known that I, LEWIS G. TUTTLE, of the town of North Haven, in the county of New Haven, and State of Connecticut, have invented a new and useful improvement in Cultivators; and I do hereby declare that the following is a full, clear, and exact description of the construction, character, and operation of the same, reference being had to the accompanying drawing, which makes part of this specification, which drawing is a perspective view of the cultivator, as taken from the near fore corner, showing the teeth or ploughs in their adjustable beams, the vertically adjustable shafts, and handles.

My improvement consists in making the cutter beams adjustable laterally to fit the rows, the shafts adjustable vertically to conform to the height of the horse, and the handles adjustable vertically to suit the height of the workman using it. I make the teeth or ploughs A A A A and A' of thin hollowed or curved steel or any other suitable material, and fit the front or centre tooth A' into a suitable block attached to the front cross-beam B, and each two of the four side teeth A A into each of the side horizontally adjustable beams C and D, as shown in the drawing. I make the two diagonal and adjustable beams C D of wood or any other suitable material, and of suitable size, and I attach the front ends each to the front cross-bar or beam B by means of bolts, one of which is shown at $a$; (while the other is concealed under H,) so that these beams may be swung to be adjusted to the width of the rows, and be secured in their proper places by means of binding or thumb-screws, (one of which is shown at $b$,) which pass through holes $c$ $c$ and $c'$ in the cross-beam or bar E, and work in corresponding slots or mortises, as $d$, in the horizontal bar C, and a corresponding one in the bar D, which is not seen. I make the shafts G and H of stiff timber, so that they will not yield much in a vertical direction; and I attach their rear ends to the rear ends of the parallel bars I and K, by bolts or joint-pins, as shown at $e$ and $e'$, (which bolts also hold the lower ends of the uprights R and S which support the handles.) And I adjust the shafts or thills to the height of the horse by suitable binding or thumb-screws, one of which is shown at $g$, which binding screws pass through corresponding holes as shown at $h$ and $h'$ in the uprights L and M, and the shafts G and H, by means of which I can adjust the shafts to the height of any horse, so as to gauge the depth of the cut of the teeth, and I steady or support the shafts laterally by means of the cross-bar N. I make the handles O and P of the ordinary shape, as shown, and attach their front ends to the parallel bars I and K by suitable bolts, one of which is shown at $l$; and I adjust the rear ends to suit the height of the workman by means of binding screws, as shown at $m$ and $m'$, which pass through corresponding holes in the uprights R and S, and the handles O and P, to render the cultivator more easy to be held or tended.

To use my cultivator, I place the horse between the shafts, and hitch the whiffle-tree to the hook T, adjust the beams C and D to the width of the rows, and the shafts to the height of the horse, as before described, so that it will allow the teeth A' A A A A to cut to the proper width and the desired depth, and adjust the handles to suit the workman, when he will be able to cut up or loosen the land between the rows to the desired depth, with the greatest certainty, ease, and convenience.

What I claim as my invention, and desire to secure by Letters Patent, is—

The combination of the shafts G and H, when made vertically adjustable, with the beams C and D, when made horizontally adjustable, and the whole is constructed and arranged substantially as herein described.

LEWIS G. TUTTLE.

Witnesses:
E. W. BALDWIN.
R. FITZGERALD.